(12) United States Patent
Johansson et al.

(10) Patent No.: US 9,686,458 B2
(45) Date of Patent: Jun. 20, 2017

(54) CAMERA LED FLASH WITH VARIABLE LENS GAIN

(71) Applicant: Sony Mobile Communications Inc., Tokyo (JP)

(72) Inventors: Magnus Johansson, Dösjebro (SE); Samir Drincic, Lund (SE); Asim Dedic, Lund (SE); Alexander Hunt, Tygelsjö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/688,009

(22) Filed: Apr. 16, 2015

(65) Prior Publication Data

US 2016/0309067 A1 Oct. 20, 2016

(51) Int. Cl.
| | |
|---|---|
| H04N 5/222 | (2006.01) |
| H04N 5/225 | (2006.01) |
| G02B 3/14 | (2006.01) |
| G03B 15/03 | (2006.01) |
| G03B 15/05 | (2006.01) |
| G03B 7/17 | (2014.01) |
| G03B 13/20 | (2006.01) |
| H04N 5/232 | (2006.01) |

(52) U.S. Cl.
CPC ............ H04N 5/2256 (2013.01); G02B 3/14 (2013.01); G03B 7/17 (2015.01); G03B 15/03 (2013.01); G03B 15/05 (2013.01); G03B 13/20 (2013.01); G03B 2215/0592 (2013.01); H04N 5/23212 (2013.01)

(58) Field of Classification Search
CPC ...... H04N 5/2256; H04N 5/2354; G03B 7/16; G02F 1/1334; G02F 2203/03

USPC .................................................. 348/370–374
See application file for complete search history.

(56) References Cited

U.S. PATENT DOCUMENTS

| | | | | |
|---|---|---|---|---|
| 6,088,540 A | * | 7/2000 | Leidig | G03B 15/05 396/155 |
| 2003/0020974 A1 | * | 1/2003 | Matsushima | G06T 5/008 358/521 |
| 2006/0045501 A1 | * | 3/2006 | Liang | G03B 15/05 396/62 |
| 2009/0141352 A1 | | 6/2009 | Jannard et al. | |
| 2011/0051425 A1 | | 3/2011 | Tsuchiya et al. | |
| 2013/0278819 A1 | * | 10/2013 | Liaw | G03B 7/16 348/370 |

FOREIGN PATENT DOCUMENTS

| | | |
|---|---|---|
| JP | 2008-145905 A | 6/2008 |
| JP | 2008-180919 A | 8/2008 |
| JP | 2014-202804 A | 10/2014 |

OTHER PUBLICATIONS

International Search Report, Application No. PCT/IB2015/057855, Dec. 23, 2015.

* cited by examiner

*Primary Examiner* — Yogesh Aggarwal
(74) *Attorney, Agent, or Firm* — Myers Bigel, P.A.

(57) ABSTRACT

The present invention relates to the field of devices with a possibility of recording light data, the device having a flash and more particular to such devices having a flash (300) which light cone (306) is adaptable. The present invention provides a method for adapting a light cone (306) from a flash (300) of a device using a liquid lens (302) and a device implementing such a method.

12 Claims, 4 Drawing Sheets

CAMERA LED FLASH WITH VARIABLE LENS GAIN

TECHNICAL FIELD

The present invention relates to the field of devices with a possibility of recording light data, the device having a flash and more particular to such devices having a flash which light cone is adaptable. The present invention provides a method for adapting a light cone from a flash of such a device and a device implementing such a method.

BACKGROUND OF THE INVENTION

Using a flash of a device with the possibility to record light data, e.g. a flash of a digital camera, video recording device or a IR camera, can be troublesome as quite often the target, i.e. an object or part of a scene in front of the device which the user of the device intends to e.g. take a photo of, is out of reach of the flash or the flash illuminates the target and its surroundings in a disadvantageous way.

In some devices, a typical flash solution is a LED flash with some sort of lens in front of the LED. The lens solution can be everything from a plastic window to a total inner reflection (TIR) Fresnel lens. Such a flash solution 200 is shown in FIG. 2. The flash 200 comprises a light source 206 emitting light 208, for example a LED light source. The flash 200 further comprises a TIR element 204 for guiding the emitted light 208 (with minimum light loss due to the TIR property of the TIR element 204) into a Fresnel lens 202.

For any type of lens to be used in a flash, a few important parameters needs to be taken into consideration, e.g. what uniformity of illumination is required, what lens gain is desired and what is the factory tolerances. The lens gain is a value that describes how much the lens will collect the light compared to a using a bare LED without a lens. A lens with a high lens gain thus provides a light cone from the flash which reaches far but only illuminates a small portion of the scene in front of the device.

A solution to the problem of not illuminating the target with the flash when e.g. taking a picture with the device may be to use a Xenon flash, but this requires high voltage and space, which often not is provided by compact devices such as a camera in a mobile phone. Another solution may be to use a high power LED with super capacitors to be able to feed the LED with higher current, which also is an unsuitable solution for compact devices such as a camera in a mobile phone.

Moreover, depending on the scene which a user of the device intends to capture, using different light cones may be advantageous. This may not be possible using a lens arrangement as described above and shown in FIG. 2.

It is within this context that embodiments of the invention arise.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by a method for adapting a light cone from a flash of a device comprising an image sensor, the flash comprising a liquid lens, the method comprising the steps of: retrieving, by using a processor, one or more features indicative of an image to be captured by the image sensor, and adapting the light cone from the flash by changing properties of the liquid lens based on the one or more features.

The present invention is based on the realization that a liquid lens has properties that may be changed in order to adapt the light cone. The liquid lens external shape is fixed, there are no moving parts: only internal liquids in the liquid lens change shape. This means that the focal point of a liquid lens can be precisely controlled and dynamically changed by modifying the surface tension of the internal liquids by using different voltages. Since no other changes to the lens are required, e.g. rotation of the lens or replacement of the lens, in order to adapt the light cone, a reduced complexity of a lens arrangement in the flash may be achieved. By adapting the light cone from the flash by changing properties of the liquid lens, i.e. by changing the surface tension of its internal liquids, based on one or more features indicative of an image to be captured by the image sensor, the light cone can advantageously be adapted based on e.g. light conditions in a scene and/or type or distance to the target and/or based on properties of the device such as the current focus setting and shutter setting. All these features influences the image to be captured by the image sensor, and by adapting the light cone in view of one or more of these features, the flash may illuminate the target/scene in an advantageous way.

As used herein, the term "scene" should be understood to represent the environment/location which the device is directed at and that will be captured in an image (picture, video sequence etc.) if the device is used. In other words, the scene is the target of e.g. the image or video sequence, and its surroundings.

According to a second aspect, the present invention is realized by a device comprising an image sensor and a flash comprising a liquid lens, the device comprising a processor configured for retrieving one or more features indicative of an image to be captured by the image sensor, and an electrowetting device for changing properties of the liquid lens based on the one or more features, thereby adapting the light cone from the flash.

The second aspect may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

In the following description, the device with a possibility of recording light data will be exemplified as a digital camera, but this is only by way of example. The device may be any device with a possibility of recording light data, e.g. a digital camera, a digital video camera, a IR camera etc.

Figure 1:
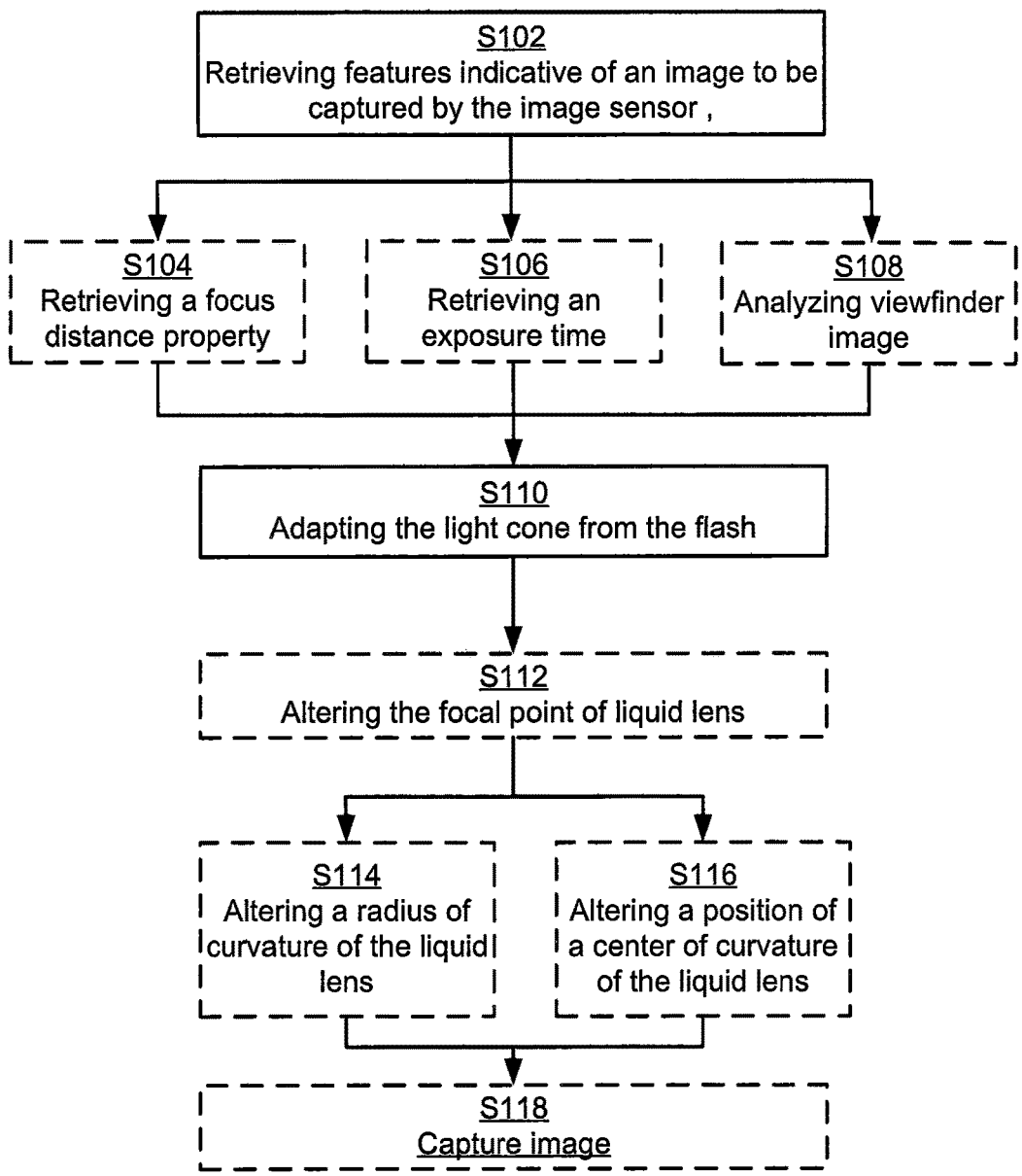
FIG. 1 shows a method for adapting a light cone from a flash of a device according to embodiments of the invention.
Figure 2:
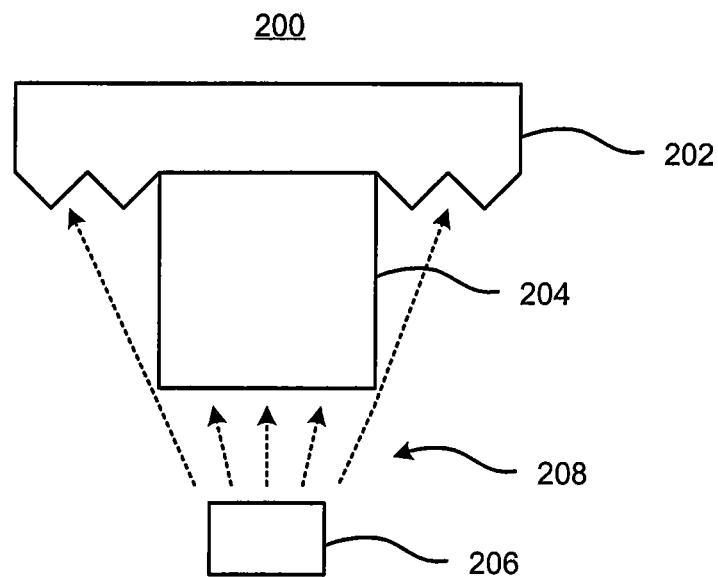
FIG. 2 shows a flash of a device according to prior art, FIG. 3 schematically shows the use of a liquid lens for adapting a light cone from a light source.

FIG. 1 show by way of example a method for adapting a light cone from a flash of a digital camera. The camera comprises an image sensor and a processor. The camera further comprises regular camera settings. An example of such a setting is shutter speed (which determines the exposure time) of the camera which is the length of time a camera's shutter is open when taking a photograph (capturing an image). A further example is the focal length of the camera lens, which determines the focus distance of the camera, i.e. the distances the camera will attempt to focus at when capturing an image. Other properties may be used, e.g. a light sensitivity of the image sensor. Moreover, the image sensor may be configured to regularly capture light to produce image data, e.g. for show in a viewfinder display at the camera. Such image data may be analyzed by the processor of the camera in order extract e.g. scene luminance in a specified region, possible targets to focus on, distance to targets, movement of targets etc. It should be noted that the above mentioned image data do not need to be shown on a viewfinder display, the image sensor may anyway be configured to regularly capture light to produce image data. According to some embodiments, a user of the camera may provide manual input for adapting the light cone, for example by pointing and pressing on the viewfinder display.

The first step of the method of FIG. 1 is retrieving S102, by using the processor, one or more features indicative of an image to be captured by the image sensor. As described above, such feature or features may be retrieved from different sources.

According to one embodiment, the step of retrieving S102 one or more features comprises retrieving S106 an exposure time of the digital camera, and extracting at least one of the one or more features from the exposure time. Since an increased exposure time means that light from the scene is captured to a higher extent, the light cone may advantageously be adapted such that the light of the target is improved, i.e. by increasing a lens gain of the liquid lens and this achieving a narrow light cone.

According to one embodiment, the step of retrieving S102 one or more features comprises retrieving S104 a focus distance property of the digital camera, and extracting at least one of the one or more features from the focus distance property. For example, at small distances a wide light cone (low lens gain) may be advantageous in order to provide a more even illumination. At long distances, a narrow light cone (increased lens gain) may be advantageous in order for the light of the flash to reach a target of the image.

According to one embodiment, the step of retrieving S102 one or more features comprises capturing light by the image sensor of the digital camera to produce image data, analyzing the image data using the processor, and extracting at least one of the one or more features from the image data. As described above, the image data may be shown on the viewfinder display of the camera. In this case, the method comprises analyzing S108 the viewfinder image using the processor in order to extract at least one of the one or more features. According to some embodiments, the step of analyzing the image data comprises using an object recognition algorithm, e.g. for finding a possible target. This will be further described in conjunction with FIG. 6 below. According to some embodiments, the step of analyzing the image data comprises measuring an amount of light in at least one part of the image data. For example, the light may be measured near or on the target in the scene. Other embodiments of measuring of light may be used in order to retrieve the one or more features indicative of an image to be captured by the image sensor will be described in conjunction with FIG. 6 below.

The next step of the method for adapting a light cone is the step of adapting S110 the light cone from the flash by changing properties of the liquid lens based on the one or more features. In this way, the adaptation of the light cone may be well substantiated, e.g. made in view of light conditions of the scene, the position of the targets in the scene, distance to target in the scene etc. By considering some or all of the above described parameters, the properties of the liquid lens can be changed and thus direct the light to the correct part of the scene with a lens gain that is appropriate to the content and surroundings.

According to some embodiments, the step of adapting the light cone comprises altering S112 the focal point of the liquid lens based on the one or more features. The focal point is adapted by changing the surface tension of internal liquids in the liquid lens. Such adaptation thus does not require a plurality of lens elements as in a mechanical zoom lens, but can instead be achieved by just modifying the surface tension of the internal liquids using different voltages. According to some embodiments, the focal point is altered by altering S116 a position of a center of curvature of the liquid lens. In this way, the direction of the light cone from the flash may be changed. According to some embodiments, the focal point is altered by altering S114 a radius of curvature of the liquid lens. In this way, the light cone of the flash may be made narrower or wider. In other words, the lens gain of the liquid lens is changed.

After the light cone has been automatically adapted as described above, a user of the digital camera may capture S118 an image and thus illuminate the scene in an advantageous way using the adapted light cone.

Figure 3:
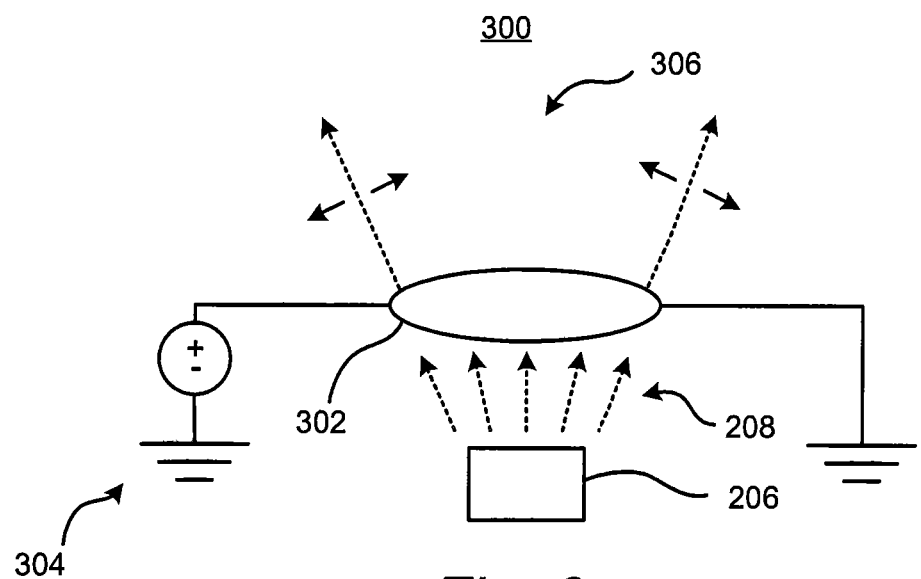

FIG. 3 schematically shows operations of a liquid lens 302 for adapting a light cone 306 of a flash 300. The flash comprises a light source 206 emitting light 208. The light source 206 may be a LED light source or any other suitable light source. The liquid lens 302 is coupled to an electrowetting device 304 which is adapted for modifying a surface tension of internal liquids (not shown) of the liquid lens using different voltages. In this way, properties of the liquid lens 302 may be changed, and thereby adapting the light cone 306 from the flash 300. For example, by increasing the voltage applied to the liquid lens 302, the radius of curvature of the liquid lens 302 is increased which means that the focal point in the light cone 306 will be closer to the liquid lens, i.e. the focal length of the liquid lens will decrease. As described above, the light cone 306 can both be made narrower or wider (increase or decrease the lens gain of the liquid lens 302), and the direction of the light cone 306 may be altered to some extent by altering a position of a center of curvature of the liquid lens 306.

Usually the liquid lens is convex and the curvature of the convex lens can be changed. Also the center of the lens can be shifted as described above. Flash LEDs usually have a really wide light cone so a concave lens is thus not required. If a Laser LED is used as the light source 206, a concave lens may be advantageous. According to some embodiments, the flash 300 comprises two liquid lenses, wherein one lens is concave and the other is convex. The properties of these lenses are controllable as in the same way as described above.

Figure 4:
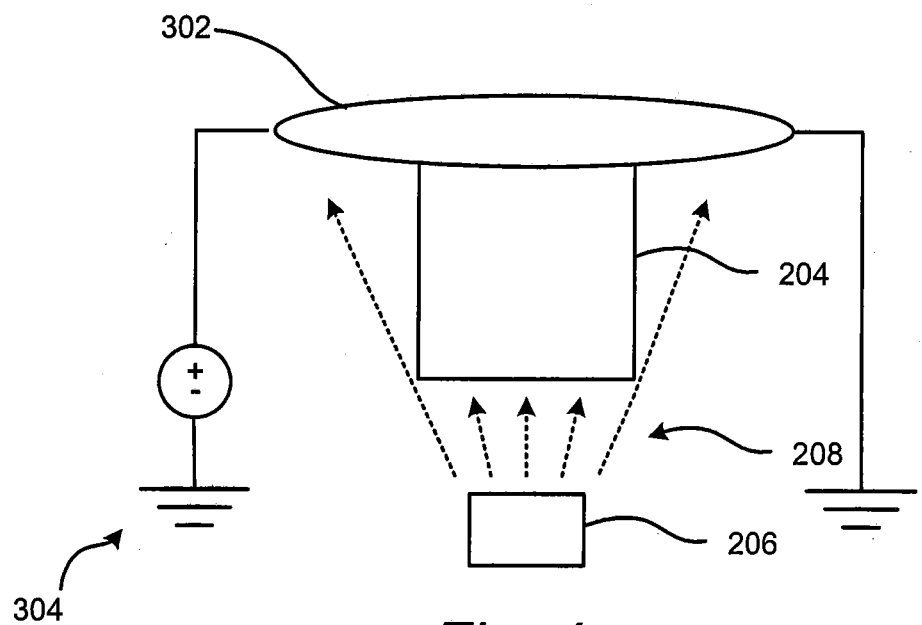
FIG. 4 shows a flash of a device according to a first embodiment of the invention.

FIG. 4 shows a flash 400 according to embodiments of the invention. The flash 400 comprises a total inner reflection, TIR, element 204. By using such TIR element 204, the light source 206 may be placed farther away from the liquid lens 302 than would be possible (without a high loss of light) if no TIR element 204 was used. This in turn makes it possible to have the liquid lens close to an outer surface of the digital camera, which is advantageous for the flexibility of direction and spreading of the light cone, while the light source 206 is placed in an inner part of the digital camera, e.g. at the printed circuit board of the digital camera. Moreover, the TIR element 204 also can be employed for guiding light from the light source 206 such that the liquid lens 302 may be made smaller, or in order to control the light cone emitted from the liquid lens 302. Any suitable material may be used for the TIR element, e.g. a glass material or PMMA.

Figure 5:
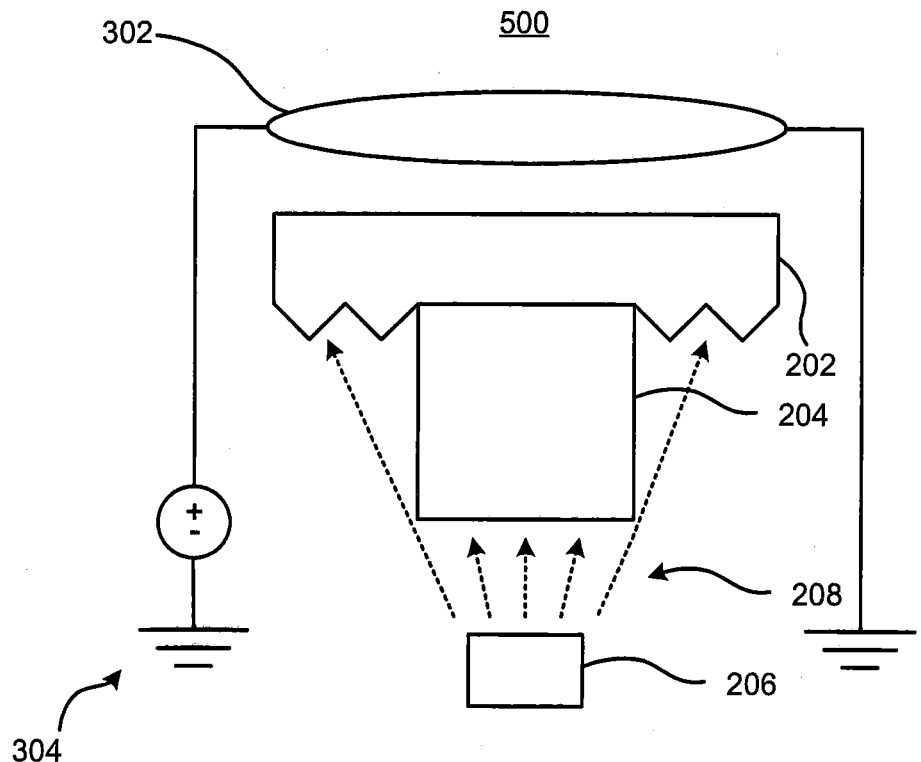
FIG. 5 shows a flash of a device according to a second embodiment of the invention.

FIG. 5 shows a flash 500 according to embodiments of the invention. The flash 500 comprises a TIR element 204, and a Fresnel lens 202. In the particular embodiment shown in FIG. 5, the liquid lens 302 is arranged to alter a light cone coupled out from the Fresnel lens 202. According to some embodiments, the liquid lens 302 is arranged to direct light 208 emitted from the light source 206 into the TIR element 204. According to other embodiments, the liquid lens 302 is arranged to direct light 208 emitted from the light source 206 directly into the Fresnel lens 202 and thus remove the need of the TIR element 208.

Figure 6:
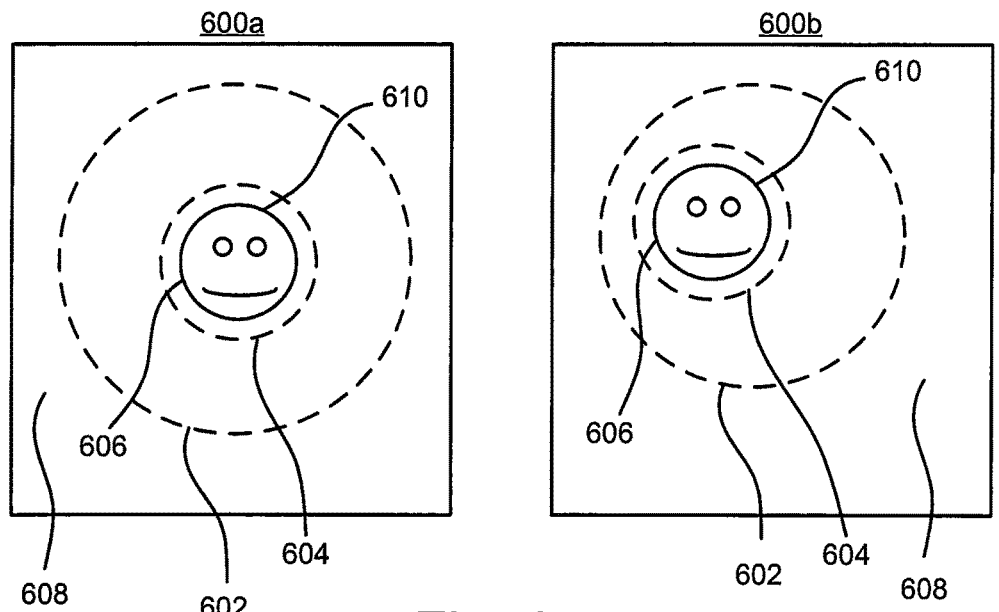
FIG. 6 shows how a light cone of a flash is adapted based on one or more features indicative of an image to be captured by an image sensor of the device.

FIG. 6 shows how a light cone of a flash is adapted based on one or more features indicative of an image to be captured by the image sensor. FIG. 6 comprises two images 600a, 600b. These may be images shown on the viewfinder display of a camera. The images 600a, 600b are representations of image data produced from captured light by an image sensor of the camera. Both images comprise a target 606, which also constitute a foreground part 610 of the images 600a, 600b. The remaining parts of the images 600a, 600b constitute a background part 608. A dotted circle 602 in the images 600a, 600b represent an outer boundary the light cone from the flash of the camera, and the dotted circle 604 represent a center part of the light cone, i.e. where the light from the flash is the brightest. As described in FIG. 6, the light cone may be adapted such that the brightest part is not in the center of the outer boundary of the light cone, by altering the position of the center of curvature of the liquid lens.

According to some embodiments, a processor of the camera analyzes such image data in order to extract at least one of the one or more features from the image data. According to embodiments, the step of analyzing the image data comprises using an object recognition algorithm, such as a face recognition algorithm or a smile detection algorithm. Such algorithms are often already implemented in software installed in the camera. Consequently, using these kinds of object recognition algorithm(s) in order to extract at least one of the one or more features from the image data may not require further developments of the image analysis software of the camera. By employing such algorithms, the properties of the liquid lens, e.g. a radius of curvature of the liquid lens and/or a center of curvature of the liquid lens, may be continuously altered in order to adapting the light cone of the flash to follow the target 606 and advantageously illuminate the target. For example, if the digital camera is used for recording a movie of a scene in front of the digital camera, such an implementation may be advantageous to achieve good illumination of a moving target 606. Such implementation may also be useful in other scenarios, e.g. if a sequence of images are captured in a row (for example if a bracketing mode or burst mode of the camera is employed). In FIG. 6, the center 604 of the light cone is following the target 606 when it is moving between the two images 600a, 600b.

According to some embodiments, the step of analyzing the image data comprises measuring an amount of light in at least one part of the image data. For example, the step of analyzing the image data may comprise separating the image data into a background part 608 and a foreground part 610, wherein the amount of light is measured in the background part and/or the foreground part. For example, if the focus distance is sat to medium distance, and the background part 608 of the image 600a, 600b is dark, the analysis made by the processor may result in a high lens gain (narrow light cone) since in general there is no information of interest in the corners of such an image. On the other hand, if the background 608 comprises strong lighting, e.g. on a sunny day, the flash may advantageously be employed for fill flash purposes (i.e. for brighten deep shadow areas on the target 610). In this case, extreme lens gain may be desired.

At a close distance to the target 608, in order to not get an over exposed center 604 which may be the case if a narrow light cone is used, a low lens gain and thus a wider light cone is advantageous.

Figure 7:
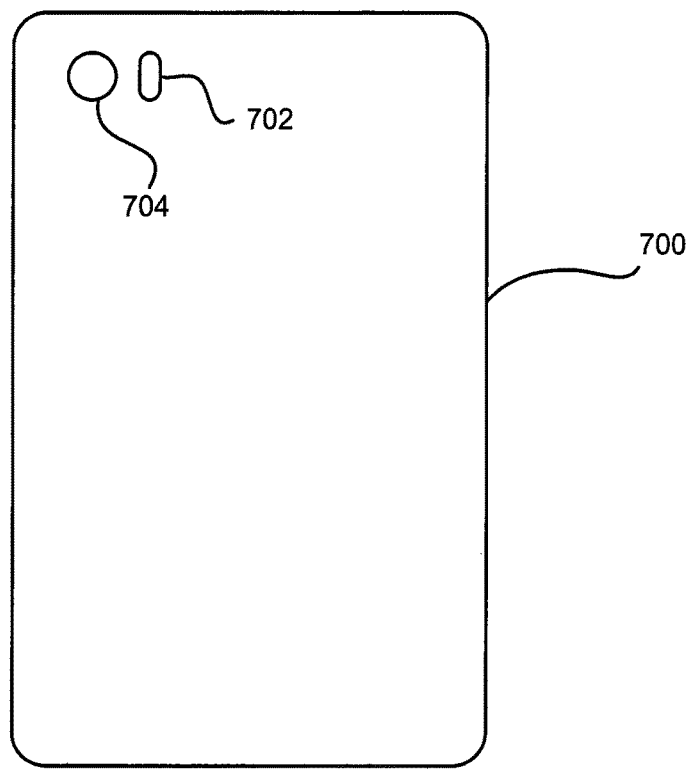
FIG. 7 shows by way of example a device with a flash according to embodiments of the invention.

FIG. 7 shows by way of example a mobile phone 700 implementing a flash 702 as described herein. Consequently, images captured through a camera lens 704 may be advantageously illuminated based on one or more features indicative of an image to be captured by the image sensor as described above.

The invention claimed is:

1. A method for adapting a light cone from a flash of a device comprising an image sensor, the flash comprising a liquid lens, the method comprising:
   obtaining, by using a processor, one or more features indicative of an image to be captured by the image sensor; and
   adapting the light cone from the flash by changing properties of the liquid lens based on the one or more features,
   wherein the obtaining the one or more features indicative of the image to be captured by the image sensor comprises:
      capturing light by the image sensor of the device to produce image data,
      analyzing the image data using the processor, wherein the analyzing the image data comprises separating the image data into a background part and a foreground part and measuring an amount of light in the background part; and
      extracting at least one of the one or more features based on the measurement of the amount of light in the background part of the image data.

2. The method according to claim 1, wherein the obtaining the one or more features further comprises:
   retrieving a focus distance property of the device, and extracting at least one of the one or more features from the focus distance property.

3. The method according to claim 1, wherein the obtaining the one or more features further comprises:
   retrieving an exposure time of the device, and extracting at least one of the one or more features from the exposure time.

4. The method according to claim 1, wherein the image data is shown on a viewfinder display of the device.

5. The method according to claim 1, wherein the analyzing the image data further comprises using an object recognition algorithm to recognize an object in the image data.

6. The method according to claim 1, wherein the adapting the light cone comprises altering a focal point of the liquid lens based on the one or more features.

7. The method according to claim 6, wherein the focal point is altered by altering a position of a center of curvature of the liquid lens.

8. The method according to claim 6, wherein the focal point is altered by altering a radius of curvature of the liquid lens.

9. A device comprising:
 an image sensor;
 a flash comprising a liquid lens;
 a processor configured for obtaining one or more features indicative of an image to be captured by the image sensor; and
 an electrowetting device for changing properties of the liquid lens based on the one or more features obtained by the processor to adapt a light cone from the flash,
 wherein the processor configured for obtaining the one or more features indicative of the image to be captured by the image sensor is configured to perform operations comprising:
 capturing light by the image sensor to produce image data,
 analyzing the image data by at least separating the image data into a background part and a foreground part and measuring an amount of light in the background part, and
 extracting at least one of the one or more features based on the measurement of the amount of light in the background part of the image data.

10. The device according to claim 9, wherein the flash further comprises a total inner reflection, TIR, element, and a Fresnel lens.

11. The device according to claim 10, wherein the liquid lens is arranged to alter a light cone coupled out from the Fresnel lens.

12. The device according to claim 9, wherein the flash further comprises a total inner reflection, TIR, element wherein the liquid lens is arranged to alter a light cone coupled out from the TIR element.

* * * * *